United States Patent [19]

Alburger

[11] 3,927,551

[45] Dec. 23, 1975

[54] FRACTURED GLASS TESTING PANEL FOR DYED LIQUID PENETRANTS

[76] Inventor: James R. Alburger, 5007 Hillard Ave., La Canada, Calif. 91011

[22] Filed: Mar. 20, 1974

[21] Appl. No.: 452,757

[52] U.S. Cl.................... 73/1 R; 73/104; 161/3.5; 161/6
[51] Int. Cl.² ........................................ G01N 19/08
[58] Field of Search ...... 73/1 A, 104, 105; 350/314, 350/318; 161/3.5, 6

[56] References Cited
UNITED STATES PATENTS

| | | | |
|---|---|---|---|
| 1,372,620 | 3/1921 | Hochstetter | 161/3.5 |
| 1,694,706 | 12/1928 | Herz | 161/3.5 |
| 3,164,006 | 1/1965 | Alburger | 73/104 |
| 3,785,936 | 1/1974 | Alburger | 204/38 |
| 3,791,198 | 2/1974 | Alburger | 73/53 |

Primary Examiner—S. Clement Swisher

[57] ABSTRACT

A testing device for dyed liquid penetrants consisting of a glass panel grit-blasted with a grit of predetermined mesh. The grit-blasted surface of the glass panel not only exhibits a roughness characteristic corresponding to the mesh number of the grit used, but it also contains minute fracture cracks which extend to varying depths in the glass surface, depending on the grit used and the impact energy of force of the grit particles during grit-blasting. The thus-formed fracture cracks are statistically reproducible in production of the test panels, and they may serve to simulate crack defects which are found in service parts. A dyed liquid inspection penetrant applied to a grit-blasted fractured glass panel forms entrapments in the fracture cracks, and the portion of these entrapments which remain throughout washing or solvent removal of surface penetrant may be measured and/or compared with reference to known penetrant standards.

4 Claims, No Drawings

FRACTURED GLASS TESTING PANEL FOR DYED LIQUID PENETRANTS

RELATED PATENTS

U.S. Pat. No. 3,174,006 - "Evaluation Performance of Liquid Penetrant Tracer Materials."

U.S. Pat. No. 3,785,936 - "Anodized Aluminum Test Panel for Evaluating Inspection Penetrant Performance."

U.S. Pat. No. 3,791,198 - "Testing Panel for Inspection Penetrants Having Cracks of Controlled Depth and Width."

This invention relates to testing devices for evaluating inspection penetrant flaw detection performance. More particularly, the invention relates to a testing panel which has in its surface a large number of minute fracture cracks which may be utilized to simulate crack defects found in service parts.

In the past, various kinds of inspection penetrant testing devices have been utilized. For example, in my U.S. Pat. No. 3,174,006, issued Jan. 5, 1965, for "Evaluation Performance of Liquid Penetrant Tracer Materials," I have described and claimed a testing device consisting of an unglazed ceramic disc or block which contains numerous natural pits and pores in its surface.

Another type of testing panel has been described and claimed in my U.S. Pat. No. 3,785,936, issued Jan. 15, 1974, for "Anodized Aluminum Test Panel for Evaluating Inspection Penetrant Performance." This panel consists of a sheet of aluminum having a brittle anodic coating in which stress cracks are induced, and in which the natural porosity of the anodic coating is sealed by means of a thin film of sodium silicate.

In my U.S. Pat. No. 3,791,198, issued Feb. 12, 1974, for "Testing Panel for Inspection Penetrants Having Cracks of Controlled Depth and Width," I have described and claimed an improved panel device in which the brittle anodic coating is stretch-cracked to provide cracks of pre-determined depth and width.

All of the foregoing testing devices were and are intended to provide for improved capability of comparison between penetrants, or for quantitative measurement of the flaw detection performance rating of a given dyed liquid penetrant.

The testing device of the present invention was devised in order to satisfy the need for an easily constructed, readily reproducible, and inexpensive testing panel which may be used either for quantitative measurements of penetrant performance or for side-by-side comparisons of penetrant materials.

The principal object of the invention, therefore, is to provide an easily constructed and inexpensive testing panel for inspection penetrants having a pattern of crack defects of known and reproducible dimensional magnitude.

Another object of the invention is to provide a testing panel which may be used conveniently for either quantitative measurements or for side-by-side comparisons of inspection penetrant materials.

Other and incidental objects of the invention will in part be obvious and will in part become apparent from the following description thereof.

Various kinds of particulate "blasting" processes have been employed in the past for surface treatment of materials such as metals, ceramics, glass, and the like. For example, rust, scale, and soil deposits are often removed from metal parts, machinery, etc., by means of "Vapor"-blasting, sand-blasting, grit-blasting, shot-peening, etc. Similar "blasting" processes have been used in the past for producing artistic or decorative effects on metals, ceramics, or glass. All of these "blasting" processes are similar in that they utilize a jet of compressed air in which there is entrained particles of a "grit" material. The grit may be sand, various kinds of silica, glass beads, carborundum, or any one of a wide variety of abrasive materials. For the purpose of this specification, the term "grit-blasting" shall be construed to include any and all types of blasting utilizing abrasive materials.

When a jet of abrasive material impinges on a surface being treated, any loose material present on the surface is removed, and the surface becomes roughened due to the impact of particles of the abrasive material. The degree of roughness depends primarily on the particle size of the abrasive "grit" which is employed. Up until now, processes of grit-blasting have been employed mainly for cleaning surfaces or for producing a desired finish on the treated surface. While some processes, such as shot-peening which utilizes spherical beads of glass or metal as the abrasive material, act to produce smooth finishes on maleable metal surfaces, I have found that in general the grit-blasting processes act to produce rough surface finishes, the degree of roughness being about proportional to the particle size of the abrasive grit.

I have discovered that a grit-blasted metal surface not only exhibits an appropriate degree of surface roughness, but it also contains a multitude of minute tears and inter-crystalline separations caused by the impact of the grit particles. Normally, the cracks and tears which appear in a metal surface are too small to be useful for evaluation of crack detection performance of inspection penetrants. Also, the metal being opaque, it is not possible to observe or measure the color intensity or fluorescent brightness of an entrapment indication without the use of a developer to draw entrapments out of the cracks.

On the other hand, glass materials are somewhat more brittle than metals, and in such surfaces the impact of a grit particle on the surface not only gouges out a bit of glass, but it generates a pattern of fracture cracks which extend down into the glass surface. I have found that the dimensional magnitude of the fracture cracks is roughly proportional to the size of the grit particles, and it is relatively easy to generate cracks which are sufficiently large to provide good indications with even low-sensitivity penetrants such as the commonly known visible-dye type penetrants.

I have found that it is possible to control the statistical distribution of fracture crack sizes in a grit-blasted glass panel by selecting the mesh number of the grit which is used and the pressure of the air jet which entrains the grit particles. For rough surfaces and relatively gross fracture cracks, a 10 or 30 mesh grit may be used at an air-pressure at the blast-gun input of about 90 to 100 psi. Gross cracks, many of which have equivalent magnitudes in the range of 40 microns or more, are generated in this manner, and such cracks are useful for evaluating visible-dye penetrant materials.

At the other extreme of usefulness for penetrant evaluation, a fine 250 mesh grit delivered from the blast-gun at an air pressure of about 20 psi will yield relatively shallow fracture cracks having fractional-micron equivalent magnitudes. Fine cracks of this nature are useful in differentiating the flaw detection performance capabilities of high-sensitivity fluorescent penetrants.

Although I make no restriction with regard to the shape or configuration of my test panel, I have found it desirable to fabricate the panel in the form of a flat glass plate having a series of steps or graduations of roughness and corresponding fracture crack sizes ranging from fine to coarse. In this way, tests on a range of penetrant sensitivities may be accomodated on a single test panel. A convenient panel configuration is one in which the glass plate employed is about 1.5 inch wide, 3 inches long, and ¼ inch thick. Three or four graduated roughness steps may be produced on one face of the plate by masking the plate with a paper tape and grit-blasting with selected grit sizes.

In addition to the above, I have found it desirable to utilize at least two kinds of glass material in making my grit-blasted test panels. Where it is desired to make quantitative measurements of penetrant entrapments by photoelectric means, I may make the grit-blasted glass panel out of a clear, colorless glass plate, such as a clear soda glass or a flint glass. The commercially available "Pyrex" (T.M.) glass is also suitable. Some optical glasses are fluorescent, and these should be avoided where the panel is to be used for evaluation of fluorescent penetrants.

Where it is desired to test penetrants under conditions which closely simulate penetrant action on service parts such as jet engine turbine blades for example, I may make the grit-blasted glass panel out of a so-called "black" glass. Such "black" glasses are not truly black, but are of a dark purple color by transmitted light, this coloration being produced by certain dissolved metallic salts or oxides. Glass material of this kind is semi-opaque, so that entrapments of penetrant in fracture cracks cannot be seen to full color intensity or fluorescent brightness until they are drawn out of the cracks by developer action. Thus, in the case of a black glass grit-blasted panel, developer performance may be evaluated as well as penetrant performance. For the purpose of this specification, the term "semi-opaque light-absorbing glass" shall be construed to include dark colored glasses such as ultraviolet filter glass or "black" glasses such as the commercially known "Detopak" (T.M.) black glass.

The grit-blasted test panels of the invention may be utilized as follows: A test penetrant is applied to the surface of the panel by means of a small applicator rod or cotton swab in the form of a streak, or streaks of two or more penetrants may be applied side-by-side for comparison purposes. Surface penetrant may be removed in accordance with known procedures, emulsification and washing, or by a solvent remover, as the case may be, leaving entrapments of penetrant in the fracture cracks. Of course, the larger the fracture crack, the larger will be the penetrant entrapment.

During the step of emulsifier, wash water, or solvent remover application, part of the penetrant entrapment will be stripped out of a given crack, and this stripping action may vary depending on the particular penetrant, emulsifier, and/ or remover which is employed, and the duration of remover contact. Since the color intensity or fluorescent brightness of an entrapment indication is a function of the amount of penetrant which remains in a crack throughout the various steps of the penetrant process, the efficiency of the process, or its flaw detection performance, may be evaluated by measuring or observing the color intensity or fluorescent brightness of crack indications.

It will be understood that a fracture-crack pattern in a glass panel produced by grit-blasting with a given grit mesh will consist of a range of crack sizes. However, the average, or mean, crack dimension will be the same for a given grit size and toughness of the glass material which is employed. It will also be understood that the equivalent dimensional magnitude of a given fracture crack may be determined by known measurement techniques.

It will be further understood that the grit-blasted glass test panel of the invention need not be flat. Any shape may be used, and if a glass plate is employed, both sides may be grit-blasted, using the same or different mesh grit as desired. As many steps of roughness may be used as desired, as for example the roughness and crack pattern conditions which are obtained by use of 10, 30, 60, 100, 150, 200, and 250 mesh grits.

It will be seen that I have devised a new and novel testing panel for use in evaluating flaw detection capabilities of dyed liquid inspection penetrants. Although the invention has been described with reference to particular embodiments thereof, it will be understood that various changes and modifications may be made therein without departing from the spirit of the invention and the scope of the appended claims.

I claim:

1. In a test method for evaluating the flaw detection performance capabilities of dyed liquid inspection penetrants in which a test penetrant is applied to the surface of a cracked testing panel, excess penetrant is removed by application of a remover, and the testing panel is examined for the presence of entrapments of penetrant in any surface cracks which may be present, the improvement wherein said testing panel consists of a glass panel having at least one surface grit-blasted to a roughness corresponding to a grit mesh in the range of from about 10 mesh up to about 250 mesh.

2. A test method in accordance with claim 1 in which said glass panel is made out of a clear colorless glass.

3. A test method in accordance with claim 1 in which said glass panel is made out of glass containing a light-absorbing material.

4. In a testing device used for evaluating the flaw detection performance capabilities of inspection penetrant materials, wherein cracks are generated in the surface of a panel, a dyed penetrant to be tested is applied to said cracked panel surface to form entrapments in said cracks, excess penetrant is removed, and the cracked panel surface is inspected for the presence of entrapment indications, the improvement in which said panel consists of a glass plate containing a light-absorbing material, said plate having at least one area on its surface grit-blasted to a roughness corresponding to a grit mesh in the range of from about 10 mesh up to about 250 mesh.

* * * * *